United States Patent [19]

Caretta

[11] 4,140,168
[45] Feb. 20, 1979

[54] VEHICLE TIRE

[75] Inventor: Renato Caretta, Gallarate (Varese), Italy

[73] Assignee: Industrie Pirelli, S.p.A., Milan, Italy

[21] Appl. No.: 790,808

[22] Filed: Apr. 25, 1977

[30] Foreign Application Priority Data

May 17, 1976 [IT] Italy .............................. 23323 A/76

[51] Int. Cl.$^2$ ................................................ B60C 9/20
[52] U.S. Cl. ........................ 152/361 DM; 152/361 FP
[58] Field of Search ...... 152/361 R, 361 DM, 361 FP

[56] References Cited

U.S. PATENT DOCUMENTS

| | | | |
|---|---|---|---|
| 2,493,614 | 1/1950 | Bourdon ........................... | 152/361 R |
| 2,958,359 | 11/1960 | Boussu et al. .................... | 152/361 R |
| 3,814,162 | 6/1974 | Hashida et al. ............... | 152/361 DM |
| 3,973,612 | 8/1976 | Mezzanotte .................. | 152/361 DM |

Primary Examiner—Albert J. Makay
Assistant Examiner—Lawrence E. Williams
Attorney, Agent, or Firm—Stevens, Davis, Miller & Mosher

[57] ABSTRACT

A vehicle tire combining improved riding comfort, road gripping characteristics and tire tread wear has the conventional radial carcass and tread and an improved annular breaker structure reinforcing the crown portion of the tire. The improved breaker structure has two or more layers of metallic cords disposed at an angle of about 10° to about 35° with the longitudinal direction of the tire. The metallic cords of one layer cross those of the adjacent layer. At least one layer of nylon or similar textile cords which shrink when the tire is heat cured is disposed between the radially outermost layer of metallic cords and the tread. The textile cords are disposed around the circumference of the tire in planes which are substantially parallel to the longitudinal direction of the tire and at densitities along the lateral edges of the breaker which are at least about 50% higher than the density thereof in the crown zone of the breaker.

7 Claims, 2 Drawing Figures

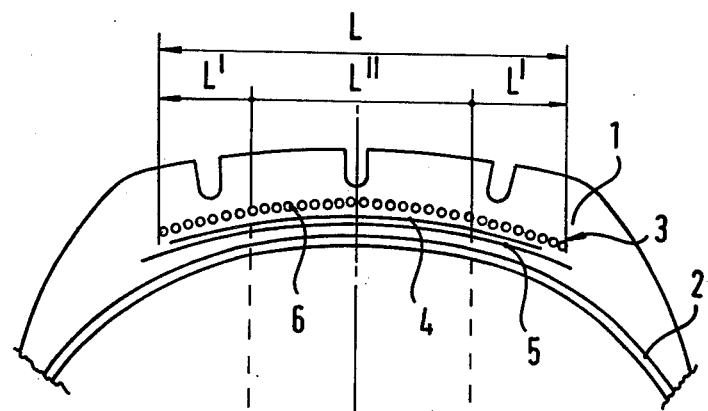
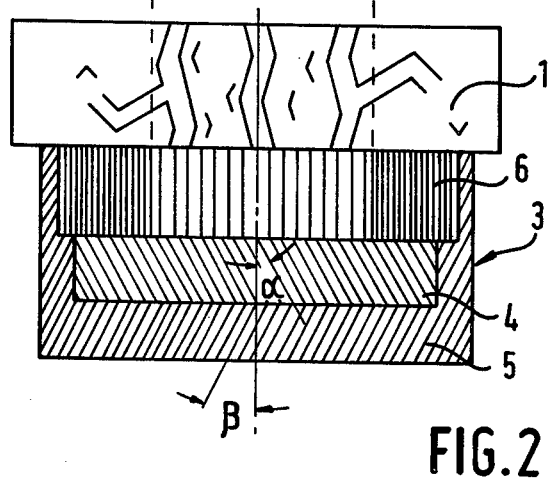

VEHICLE TIRE

The present invention relates to radial tires, i.e., to tires for motor vehicles which are provided with a carcass formed by cords lying on planes passing through the axis of rotation of the tire or forming small angles with these planes. More particularly, the invention relates to the breaker structures for radial carcass tires.

It is known that all tires of this type must have a relatively rigid annular breaker structure inserted between the tread and the carcass.

This structure, which in the present specification, will be simply called "breaker", influences considerably the behavior of the tire, according to its geometry (i.e., to the angular relationship existing between the cords of which it is made) and according to the material constituting it. The most important aspects of the behavior of the tire which is directly influenced by the breaker are the grip, the comfort and the wear of the tread.

As it is known, the grip is determined by the drift characteristic of the tire. That is, the relationship between the steering angle and the transversal force that the tire exerts on the ground. This characteristic mainly depends on the torsional and transversal rigidity of the breaker.

By the term "comfort" is understood the lack of noise that the tire generally tends to produce during rolling on the road surface and particularly the capacity of the tire to absorb an obstacle with local deformations thereby attenuating the jolt to the tire by the obstacle. This capacity depends principally upon the radial rigidity of the breaker.

The wear of the tread is determined not only by the intrinsic physical characteristic of the compound from which the tire is made to resist abrasion, but also by the tendency of the tread to move in the contact area with consequent creeping against the ground. This tendency depends largely on the torsional and circumferential rigidity of the breaker.

The three aforesaid aspects of the behavior of the tire can be controlled by variations of the physical characteristics of the breaker. However, this is not as simple as it might appear because a change in physical characteristics might improve one but deleteriously effect another of the tire's behavior characteristics. For example, it might be desirable to have one particular physical characteristic to improve the comfort of the tire but such a characteristic might deleteriously effect the road gripping characteristics of the tire to the extent that improvement to riding comfort would be impractical.

An advantageous compromise among the various behavior requirements is provided by a breaker structure which has two crossed metallic layers in which the cords form with respect to the longitudinal direction of the tire a relatively small angle of say about 20° and at least one strip of nylon cords oriented along the longitudinal axis of the tire and disposed above the crossed metallic layers. As it is known, nylon is a textile material which shrinks or reduces its length if subjected to heat. Consequently, nylon cords in the finished tire are in a pre-tension state, due to the fact that they were reduced in length by the curing heat while the underlying metallic cords were not.

The geometrical configuration of such a breaker structure is such that it imparts to the breaker a high transversal, circumferential and torsional rigidity (with the consequent improvements on grip and wear characteristics) and at the same time it assures a low radial rigidity so as to give the tire the necessary comfort. The applicant has found, however, that such a breaker is susceptible to further improvement, particularly in tires which are intended to be used for the most severe service conditions, such as at high speeds.

It is therefore an object of this invention to provide an improved annular breaker structure for a vehicle tire. Another object of the invention is to provide a vehicle tire having a breaker structure which imparts an improved all around behavior to the tire.

Other objects will become apparent from the following description with reference to the accompanying drawing wherein FIG. 1 is a radial cross-section of one embodiment of the tire of this invention; and FIG. 2 is a plan view of an embodiment of the breaker structure of the tire of FIG. 1 with some parts removed to show the arrangement of the cords in the breaker.

The foregoing objects of the invention are accomplished by providing a pneumatic tire for motor vehicles having a radial carcass, a tread and a breaker structure lying between the carcass and the tread, the breaker structure having at least two layers of metallic cords, the cords of each layer being parallel to one another and crossed with respect to those of the adjacent layer, the cords forming an angle with respect to the longitudinal direction of the tire between about 10° and about 35°, the layers having a width not smaller than that of the thread, and at least one strip of cords of textile material which reduces in length when heated, the cords being oriented substantially parallel to the longitudinal direction of the tire, the strip having a width not smaller than that of the tread and being arranged in a radially outermost position with respect to the layers of metallic cords, characterized by the fact that at each lateral zone of the breaker the textile cords are arranged to provide a density which is about 50 to 100% higher than the density of the textile cords of the crown zone of the breaker.

Any suitable textile cord which will shrink in length when heated may be used but nylon (aliphatic polyamide) cords are preferred.

In the present description, by "crown zone" of the breaker is understood the central part of the breaker with a width about equal to 45–75% of the width of the structure. By the expression "lateral zone" of the structure is meant the remaining percentage of the width of the structure. The widths of the two lateral zones are equal to each other.

As said above, the density of the textile cords at the lateral zones of the breaker of the tires according to the present invention is at least 50% higher than that of the textile cords which are arranged in the crown zone. The density of the cords arranged in the lateral zones can be as much as 100% higher than the density of the cords of the crown zone. More particularly, the density of the cords at the crown zone can vary between 50 and 100 threads/dm, while the density of the cords at the lateral zones of the tread can be between 100 and 150 threads/dm. It has been found that the adoption of the breaker structure provided by the invention produces a substantial improvement in the performance of the tire both at normal speeds and at the highest ones. Clearly, a greater density of nylon cords in the lateral zones of the breaker with respect to that of the crown zone provides a greater rigidity just in those zones where the stresses of longitudinal and torsional deformation of the tire during service are most concentrated with the comfort of the tire due to the lower rigidity conferred to the crown zone by the breaker, remaining unchanged.

However, it has been found surprisingly that, besides the improved functional characteristics provided by greater rigidity in the lateral zones of the breaker with respect to the longitudinal and torsional stresses, there is also a better behavior of the tire with respect to the transversal stresses and, on the whole, an optimization of all the characteristics required from this type of tire.

Practically, it has been found that such a breaker structure produces a uniform distribution of the different stresses to which the tire is subjected during use. Making the hypothesis, without being bound thereto, that the breaker structure reacts against the stresses in the above described way since the structure can be assimilated, schematically, to a grid constituted by lozanges (the metallic cords which cross with one another), with the nylon cords in a pre-tension state disposed thereon in a longitudinal sense to act as springs; at the lateral zones of the breaker, the number of springs for unity of width, i.e., of nylon cords, is higher while in the crown zone the number of the cords, or springs, is lower. If we suppose now that any deformation stress developed during the use of the tire is applied to the breaker at its ends, every single lozange arranged in the zone will tend to be deformed, but it will be prevented from doing so by the opposition of the springs, i.e., of the overlapping nylon cords. As a result, the other lozanges, those surrounding the lozanges which are prevented from deforming under stress and therefore also those lozanges which are bound by a smaller number of springs (in the crown zone of the breaker), will receive an "induced" deformation of a moderate entity, but they will be, in comparison with the lozanges arranged at the lateral zones of the breaker, per se freer to deform since they have lesser bonds than the preceding lozanges. Therefore, the stress applied at the lateral zones of the breaker besides producing a smaller deformation of the parts of the structure, is distributed little by little in a uniform way along the whole width of the breaker; consequently the whole breaker participates in withstanding the different stresses without resorting to a more complicated structure.

The breaker structure according to the present invention is obtained in conformity with modalities per se known. The strip of nylon cords can be made, for example, with the winding of one cord which is applied on the layers of metallic cords arranged on the green shaped carcass of the tire. The application is made by winding the cord according to a pitch which varies from one end of the breaker to the other, so as to obtain a higher density at the edges and a lower one at the crown zone but within the density range indicated above.

In other words, at the two lateral zones of the breaker, the pitches of the cord convolutions will be equal to one another and lower than that of the convolutions of the same cord in the crown zone.

Alternatively, it is possible to apply at each of the two lateral zones of the breaker, a winding of a nylon cord with a pitch which allows the convolutions to be arranged according to the desired higher density, while at the crown zone a strip of nylon cords is applied, the cords being arranged in a longitudinal direction at a lower density than that of the nylon cords arranged at the lateral zones. The length of the strip circumferentially wound around the metallic cord layers of the breaker is such that its ends are overlapped to provide an overlapping portion.

Still, alternatively, the strip of nylon cords can be constituted by three strips, two having the same width of each lateral zone, and the third having the width equal to the crown zone of the breaker, each strip being constituted of nylon cords arranged longitudinally. Obviously, the two strips intended for the lateral zones will have the cords at a higher density and the third strip will have the cords at a lower density in the range of values indicated above. The lengths of the strips circumferentially wound around the metallic cord layers of the breaker are arranged on the shaped carcass such that the ends of each strip can be overlapped with lengths thereof overlapping. The strips are disposed to be adjacent to each other.

Preferably, the strip of nylon cords of the breaker structure are applied on the layers of metallic cords when the carcass, already shaped into a toroidal configuration and devoid of any element constituting the breaker, has been subjected to a second shaping together with the two or more layers of metallic cords put on it, as already described in Italian Patent Application No. 25 355 A/74 filed on July 19, 1974, the disclosure of which is incorporated herein by reference.

Referring now to the drawing, FIGS. 1 and 2 show a radial tire having a tread 1, a carcass 2 and an annular breaker 3 radially disposed between the tread and the carcass. The breaker 3 has two layers 4 and 5 of metallic cords and a strip 6 of nylon cords nearest the tread. That is, the strip 6 is radially outer with respect to the layers of metallic cords.

The metallic cords of the layer 4 are parallel to one another and inclined at an angle $\alpha$ equal to 20° with respect to the circumferential direction of the tire. The metallic cords of the layer 5 are parallel to one another and inclined at an angle $\beta$, equal to 20°, with respect to the circumferential direction of the tire and are disposed in a direction opposite to that of the cords of layer 4. The nylon cords of the strip 6 are helically wound with the convolutions arranged in a direction substantially parallel to the circumferential direction of the tire. As can be seen from the drawing, the density of the cords is, in the lateral zones of the breaker, higher than that of the nylon cords in the crown zone.

The width of the layers of metallic cords and of the strip of nylon cords is substantially the same, except for small differences due to the necessary graduations existing among the various elements constituting the breaker. The width of the layers and strip are of the same order as the width L of the tread.

The metallic cords consist of metallic wires having a diameter of 0.25 mm, stranded together according to a formulation of 1 × 4, i.e., each cord is constituted by four wires having the aforesaid diameter twisted together. The metallic cords are arranged to have a density in the range normally used in the technique of the art, i.e., 70 cords per dm.

The nylon cords have a denier count equal to about 940 × 2. At each lateral zone L' of the breaker, the density of the nylon cords is equal to about 120 cords per dm, while in the crown zone L" the density is about 70 cords per dm. The width L' of each lateral zone is equal to about 25% of the width L of the breaker. As previously stated, the radial tires having the aforesaid breaker structure have given proof during working conditions of improved characteristics of grip, security, steering response, and tread wear, if compared with similar tires in which the nylon cords forming the strip 6 are arranged according to a constant density along the whole breaker width equal to 100 cords per dm. Furthermore, the radial rigidity, i.e., the comfort of the tires made according to the invention, is of the same level as that of such prior art tires.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A pneumatic tire for motor vehicles comprising a radial carcass, a tread and a breaker structure lying between said carcass and said tread, said breaker structure comprising at least two layers of metallic cords each having a defined width, the cords of each layer being parallel to one another and crossed with respect to those of the adjacent layer, said cords forming an angle with respect to the longitudinal direction of the tire of between 10° and 35°, and at least one layer of textile material cords which reduces in length when subjected to heat, said textile material cords being oriented in the longitudinal direction of the tire, said layer of textile material cords being arranged in a radially outermost position with respect to said layers of metallic cords and having a defined width which is substantially the same as the defined width of the metallic cord layers, said layer of textile material cords being divided into a central portion defined as the crown zone of said breaker structure and two lateral portions on opposite sides of said central portion defined as the lateral zones of said breaker structure, characterized by the fact that in each lateral portion of said textile material cord layer the textile cords are arranged to have a density which is about 50 to 100% higher than the density of the textile cords in the central portion of said textile material cord layer.

2. The pneumatic tire of claim 1 characterized by the fact that the density of said cords of textile material placed in each of the lateral zones of the breaker is between 100 and 150 cords per dm, the density of the cords of textile material in the crown zone of said breaker being between 50 and 100 cords per dm.

3. The pneumatic tire of claim 1 characterized by the fact that said crown zone has a width between 45 and 75% of said breaker width, the widths of said lateral zones being equal to each other.

4. The pneumatic tire of claim 1 characterized by the fact that said layer of textile cords is constituted by the winding of one cord according to a pitch which, at the lateral zones of said breaker is lower than that of the crown zone.

5. The pneumatic tire of claim 1 characterized by the fact that said layer of textile cords is constituted by the winding of a cord at each lateral zone of the breaker, and by the winding at the crown zone of the breaker of a strip of said textile cords having a width equal to that of said crown zone and extending longitudinally along the whole circumferential development of the breaker, so that its ends are overlapped, the winding pitch of the textile cord in each lateral zone being lower than the distance existing between the contiguous cords of the textile card layer at the crown zone.

6. The pneumatic tire of claim 1 characterized by the fact that said lateral and central portions of said layer of textile material cords is constituted by three strips adjacent to one another in an axial direction of said tire, each of them extending longitudinally along the whole circumferential development of the breaker so that in each strip the ends are overlapped with a surmounting stretch, said strips having a width corresponding to each of said lateral zones and to said crown zone of said breaker, respectively, the density of the textile cords of said strips in said lateral zones being higher than that of the textile cords of said strip in the crown zone.

7. The pneumatic tire of claim 1 characterized by the fact that said tread has a defined width and the width of said layer of textile material cords is not less than the width of said tread.

* * * * *